March 5, 1940.  A. RYDQUIST  2,192,651

WEATHER STRIPPING AND THE LIKE

Filed April 29, 1936

INVENTOR.
Adolph Rydquist
BY Cumpston & Shepard
his ATTORNEYS

Patented Mar. 5, 1940

2,192,651

UNITED STATES PATENT OFFICE 2,192,651

WEATHER STRIPPING AND THE LIKE

Adolph Rydquist, Rochester, N. Y., assignor to The Schlegel Manufacturing Company, Rochester, N. Y., a corporation of New York Application April 29, 1936, Serial No. 76,979

3 Claims. (Cl. 296—44.5)

This invention relates to structures for excluding air and drafts at the joint between a closure and a frame or other part associated therewith, and also for cushioning the closure.

An object of the invention is the provision of a generally improved and more satisfactory weather stripping and closure cushioning and guiding construction.

Another object is the provision of such a construction which is particularly adapted for, although not confined to, the windows of motor vehicles.

Still another object is the provision of various simplified and highly efficient forms of weather stripping and the like.

A further object is the provision of simple and effective means for mounting the weather stripping or holding it in its intended place.

A still further object is the provision of improved means for guiding the edges of a movable window glass.

To these and other ends the invention resides in certain improvements and combinations of parts, all as will be hereinafter more fully described, the novel features being pointed out in the claims at the end of the specification.

In the drawing.

Similar reference numerals throughout the several views indicate the same parts.

Figure 1:
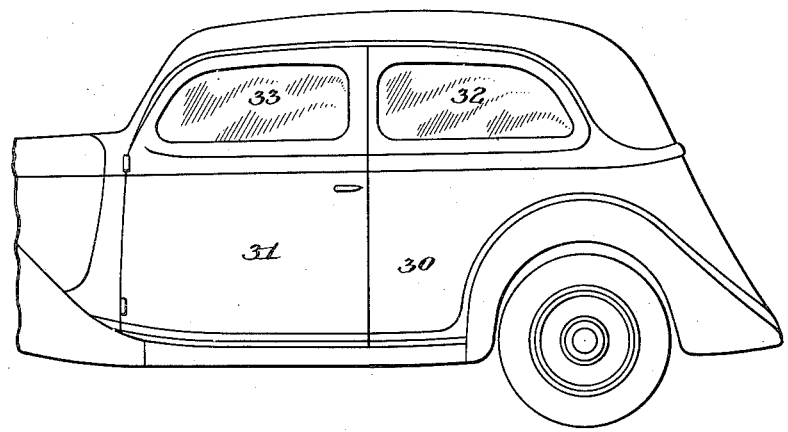
Fig. 1 is a fragmentary side view of a motor vehicle to which certain features of the present invention are particularly applicable.

The present application is a continuation in part of my United States patent application for Window cushioning construction, Serial No. 697,315, filed November 9, 1933, and is also a continuation in part of my United States patent application on Anti-rattling strip, Serial No. 718,803, filed April 3, 1934.

A preferred embodiment of the invention as applied to the windows of motor vehicles will now be described with reference to Figs. 1 to 5, inclusive, of the drawing. In this embodiment, the motor vehicle, which may be of any suitable type or kind, is indicated in general by the numeral 30. It has a hinged door 31. Suitable openings are provided in the vehicle body, including the door portion thereof, and these openings are closed by suitable closures, such as window glass 32 and 33, which may be either fixed or movable in the respective openings. Preferably the closures are movable so that they may be opened and closed.

Similar or identical weather stripping or mounting means may be used around these two closures 32 and 33 so that it will be necessary to describe only the weather stripping and mounting means used for one of these two closures, and that associated with the closure 33 in the door 31 has here been selected for description.

Figure 2:
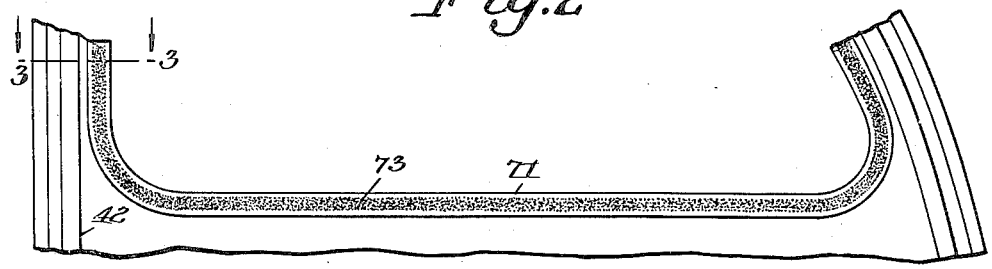
Fig. 2 is a side view of a fragment of the door of the motor vehicle shown in Fig. 1, with parts omitted to show more clearly the construction of other parts.
Figure 3:
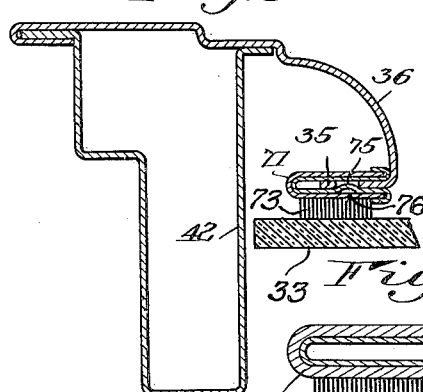
Fig. 3 is a section taken substantially on the line 3—3 of Fig. 2.
Figure 5:
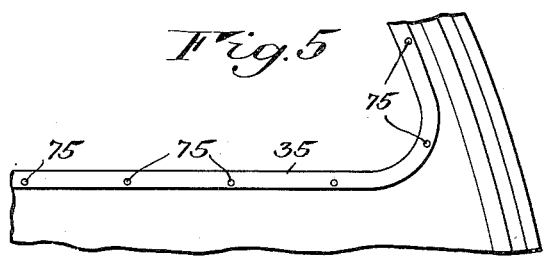
Fig. 5 is a view similar to a fragment of Fig. 2 with the weather stripping omitted to illustrate the construction of the frame parts.

The closure opening or window opening in the door 31, like that in the main body portion 30, is defined or outlined by a suitable frame or molding on the outside of the pane of the window glass and another frame or molding on the inside of the window glass. The frame or molding on the outside of the window glass preferably comprises a sheet metal flange or web 35 extending around all or substantially all the perimeter of the window opening and lying substantially parallel to and spaced from the plane of the window glass 33, and also a sheet metal portion 36 extending from the web 35 in a general direction outwardly or away from the glass 33, the portions 35 and 36 preferably being formed integrally with each other, as best shown in Fig. 3. On the inner side of the window glass 33, there may be a similar sheet metal flange or web (not shown) substantially parallel to and spaced from the glass 33. A metal plate portion 42 forms part of the hollow molding or frame extending around the edge of the door structure. As seen from Figs. 1 and 2, the outline of each window opening is formed of straight or nearly straight sides which are connected to each other by curved corners, curved on a substantial radius.

In the space or slot between the web 35 and the other web above mentioned, is mounted the closure 33, such as a window glass. Weather stripping and cushioning means is mounted on the webs, on opposite sides of the glass 33, to contact with the glass for the purpose of sealing the joint to prevent ingress of air when the window is closed, and also for the purpose of cushioning the window and preventing rattling thereof during travel of the vehicle, while yet leaving the window free to perform its opening and closing movements.

Figure 4:
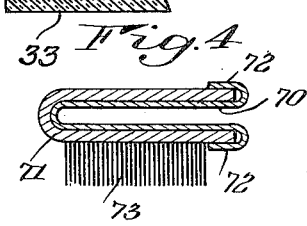
Fig. 4 is a view on a larger scale of a part of the weather stripping construction shown in Figs. 2 and 3.

A strip of cushioning and weather stripping material is applied to the web 35 to guide and cushion one side of the glass 33. This strip, in the embodiment shown, is of the generally U-shaped form indicated in Fig. 4, and comprises a U-shaped body 70 of thin sheet metal doubled upon itself transversely of the width of the strip throughout its whole length, to provide side walls or portions which are approximately parallel to and spaced from each other as shown in Fig. 4. A woven textile body 71 is secured to the outer surface of one side wall portion of this U-shaped metal body 70. The woven textile body may, if desired, be cemented or riveted to the metal body, but a convenient and preferred method of attachment is to extend the textile body 71 around the outer surfaces of both side walls or legs of the metal body 70, and clamp the edges of the textile body 71 to the metal body 70 by turning the marginal edges of the body 70 back upon each other as indicated at 72 in Fig. 4, to hold the edges of the textile body 71 securely in place.

The woven textile body 71 is provided with a mass or body of long stiff pile 73 extending in a strip or line along one side wall or leg of the generally U-shaped weather strip, continuously throughout its whole length. When the weather strip is applied to the web 35, the long stiff pile 73 projects from the woven body 71 toward and into contact with the glass 33 and serves to cushion the glass and seal the joint between the glass and the frame in a water tight manner, without interfering with the opening and closing movements of the glass.

This weather stripping is applied to the web 35 by placing it over the free edge of the web 35 in embracing relationship thereto, as plainly seen in Fig. 3, with the inner surfaces of the side walls of the metal member 70 contacting with the opposite surfaces of the web 35, as shown. The metal of which the U-shaped member 70 is constructed is preferably sufficiently thin and weak so that the strip may be easily bent by hand around the corners of the window opening, as shown in Fig. 2, while it is being applied to the web 35. As this curve lies in the plane of the web 35, the bending of the U-shaped weather strip in this plane may cause some buckling of the side walls of the metallic portion 70, but such buckling as is thus produced is not sufficiently serious to interfere with the proper functioning of the weather stripping. Hence, as seen from Fig. 2, the same continuous strip of weather stripping may extend around parts of two or more sides of the window opening and around the curved corners connecting the sides to each other.

If it is desired to avoid the slight buckling which occurs when this strip is bent around the corners, or if it is desired to make the metal parts 70 of thicker and heavier metal which could not be readily bent by hand around the corners of the window opening, then this weather strip may be provided in the portions which are to be bent around the window corners, with a series of transverse slits or cuts, spaced at suitable intervals of, say, about one inch apart, extending inwardly from that edge of the weather stripping which will be the outer edge of the corner bend, in toward but not quite to the extreme inner edge of the weather strip. Thus, where such slits are provided, the weather strip will be a series of segments connected to each other only by narrow uncut strips of metal at the edge which will be the inner edge when bending takes place. The slits preferably extend through the woven textile body 71 as well as through the metal 70. When the metal is thus slitted, it may readily be bent by hand around reasonable curvatures such as those shown in Fig. 2, without buckling of the side walls of the U-shaped member, even when the metal is of considerable thickness and strength.

The U-shaped weather stripping may be retained on the web 35 in any suitable manner, such as by riveting, cementing, or the like. One manner of retaining the weather stripping in place which has been found to be particularly simple, inexpensive, and efficient, and which is at present preferred, is to provide the web 35 with a series of small perforations 75 at short intervals, say about four or five inches apart. Then the metal 70 is deformed or displaced, as indicated at 76, so that a portion of the metal extends preferably into each of the openings 75, thus interlocking the U-shaped member with the web 35 and holding it securely in place thereon. This displacing of the metal at 76 may be easily accomplished by placing a punch against the U-shaped member over the location of the hole 75, and giving this punch a moderate blow or tap with a hammer or mallet. When the metal of which the portion 70 of the U-shaped weather strip is made is quite thin, as is preferably the case, a skilled operator can feel by hand, with the punch, where the holes 75 are located, and thus will have no difficulty in placing his punch in proper position over these holes in order to deform the metal into the holes, as shown.

The weather stripping of the present invention has been described, for the sake of a convenient example, in connection with the windows of a motor vehicle, since the present weather stripping is particularly adapted and suitable for such use. It is by no means confined in its usefulness to the windows of motor vehicles, however, but may be used in general for doors, windows, or other closures of any desired structures, either stationary, like houses, or movable, like vehicles. It will be readily appreciated by those skilled in the art that although the term "weather stripping" has frequently been used in describing the construction herein disclosed, yet this construction is more than mere weather stripping, since the long stiff pile acts not only as a weather seal but also as a cushioning strip to give adequate cushioning and support to a window or other closure, and to form a guideway along which the closure may move, and acts also to reduce or prevent vibration and rattles, so that the construction may be called an anti-rattling strip. It is also apparent that other forms of cushioning material may be substituted for the long stiff pile, if desired, although the long stiff textile pile usually gives far better results and is greatly preferred over other possible cushioning materials.

While one embodiment of the invention has been disclosed, it is to be understood that the inventive idea may be carried out in a number of ways. This application is, therefore, not to be limited to the precise details described, but is intended to cover all variations and modifications thereof falling within the spirit of the invention or the scope of the appended claims.

I claim:

1. A weather stripping construction comprising a closure, a sheet metal member including a web element substantially parallel to and spaced from said closure, a generally U-shaped metallic element clipped over an edge of said web element and embracing opposite surfaces thereof, said U-shaped element being of elongated form and extending continuously for a substantial distance along said web element, a strip of woven textile material permanently mounted on said U-shaped element, a body of relatively long stiff pile projecting from said woven strip toward said closure to contact therewith, a cut-out portion in one of said elements, and a portion on the other of said elements displaced so as to engage in said cut-out portion to assist in holding said two elements in cooperative relation to each other.

2. A weather stripping construction comprising a closure, a sheet metal member including a web substantially parallel to and spaced from said closure, said web having a plurality of apertures therein, a strip of woven textile material mounted on said web, a body of relatively long stiff pile projecting from said woven strip toward said closure to contact therewith, a metallic sheet secured to said woven strip and extending in generally U-shaped form along two sides of said web and around one edge thereof in embracing relation thereto, the shape and size of said U-shaped sheet serving to prevent displacement thereof from said web in directions perpendicular to the plane of said web, and a plurality of displaced portions in said metallic sheet, said displaced portions extending at least partially into said apertures to retain said metallic sheet and said woven strip against displacement from said web in directions parallel to the plane of said web.

3. As a new article of manufacture, a relatively thin cushioning strip comprising a strip of sheet metal doubled back sharply upon itself to provide two side portions slightly spaced from each other and having substantially plane inner surfaces and adapted to be clipped over a thin edge of a stationary support, a layer of woven textile material extending over the outer surfaces of both of said side portions, the free outer edge of each of said side portions being doubled back upon itself to clamp the margin of said textile material to hold it in place, and a strip of relatively long stiff pile projecting outwardly for a substantial distance from said textile material on one of said side portions to provide a thick cushioning pad.

ADOLPH RYDQUIST.